March 26, 1929. H. MORAN 1,706,739
POWER TRANSMISSION MECHANISM COMPRISING VARIABLE SPEED GEARING
Original Filed Dec. 31, 1926   3 Sheets-Sheet 1
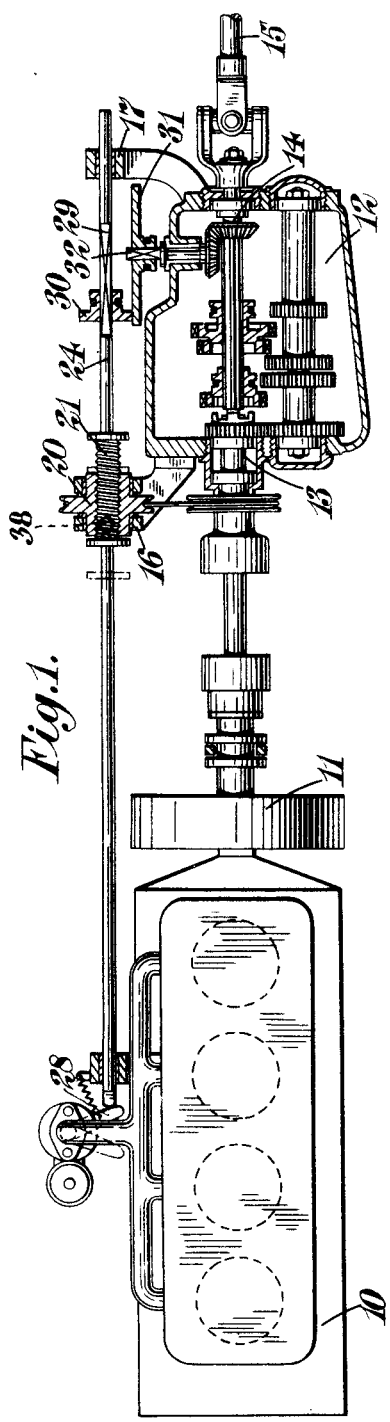
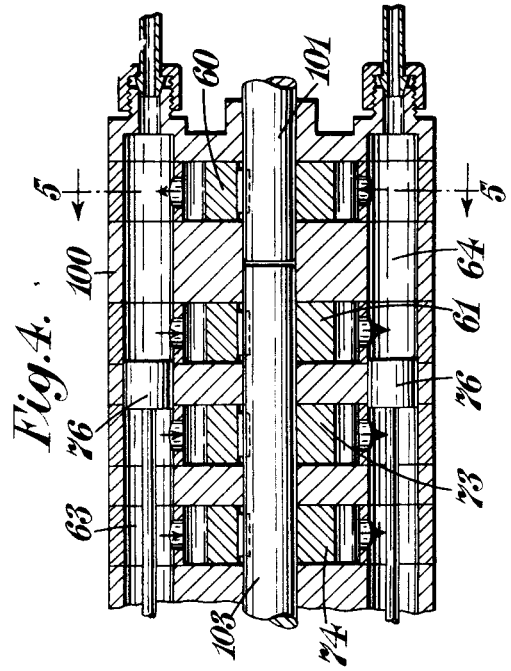
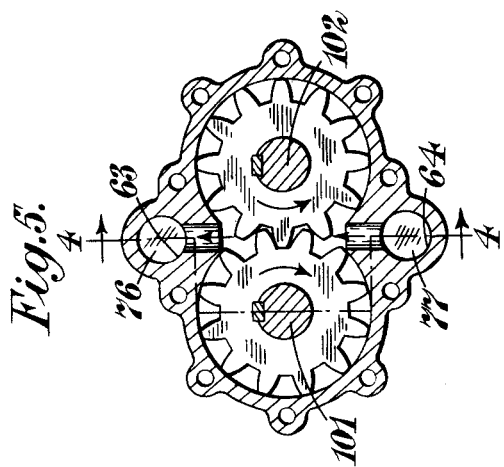
INVENTOR March 26, 1929.　　　H. MORAN　　　1,706,739
POWER TRANSMISSION MECHANISM COMPRISING VARIABLE SPEED GEARING
Original Filed Dec. 31, 1926　　3 Sheets-Sheet 2
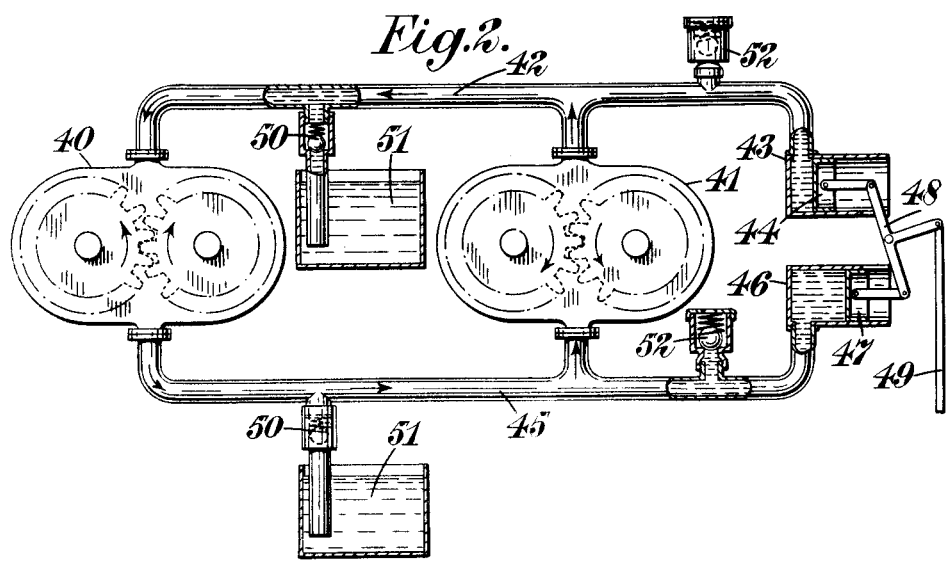
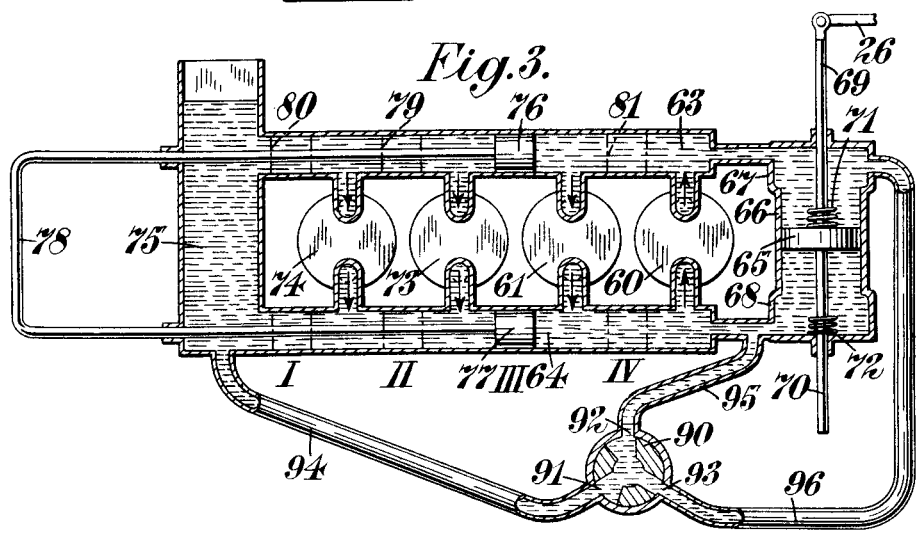

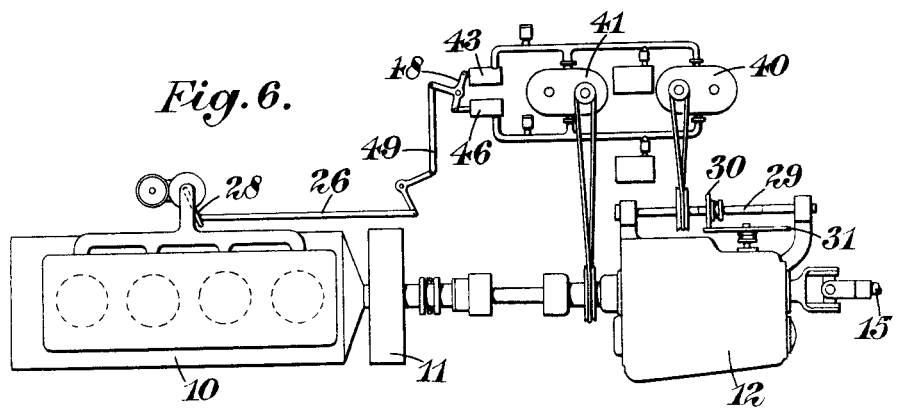

Patented Mar. 26, 1929.

1,706,739

UNITED STATES PATENT OFFICE.

HENRY MORAN, OF LONDON, ENGLAND.

POWER-TRANSMISSION MECHANISM COMPRISING VARIABLE-SPEED GEARING.

Original application filed December 31, 1926, Serial No. 158,257, and in Great Britain January 16, 1926. Divided and this application filed March 18, 1927. Serial No. 176,426.

This invention relates to power-transmission mechanism comprising an engine, a change-speed gear driven thereby, and a driven shaft driven by said gear, particularly such as is used on motor-driven vehicles, although the invention is not restricted to such vehicles, as it is applicable to the power-transmission mechanism of motor boats, cranes and the like. One form of such mechanism is described and claimed in my co-pending patent application Serial No. 158,257, from which this application has been divided.

The invention has for its object to facilitate gear changing and to prevent injury of the change-speed gear by providing that when it is desired to change to a different gear ratio, either higher or lower, the engine speed shall be adjusted before changing the gear to that which is required with the new gear ratio in operation.

According to an important feature of the invention there is provided power-transmission mechanism comprising an engine having a speed-control member, a change-speed gear driven by the engine, and a driven shaft driven by said gear, in combination with a differential mechanism comprising two elements each in the form of a "converter" (for example a pump) operatively connected respectively with the engine and driven shafts of the change-speed gear and arranged to operate in opposite senses on said speed-control member, and control means adjustable at will for adjusting the differential operation of said "converters" selectively to a ratio equal to a desired gear ratio of the change-speed gear, for the purpose of so adjusting the engine speed relatively to the speed of the driven shaft that their ratio is equal to the gear ratio to which the control means is set. The term "converter" as used in this specification and in the appended claims is intended to include any device which is capable of converting energy of rotation into energy of a different form, such as hydraulic or electric energy.

This construction enables that before a new gear ratio of the change-speed gear is brought into operation, the speed of the driving shaft of the gear may be so adjusted in relation to the speed of the driven shaft thereof that the same is correct for the required new gear ratio, whereby the change can be effected readily and without risk of injury to the wheels of the gear.

According to another feature of the invention the converters aforesaid are in the form of two pumps (for example rotary pumps, such as pumps of the gear-wheel type), two conduits connect the suction ports of both pumps each to the delivery port of the other pump, and adjusting means (for example a piston) actuated by the difference of the fluid pressures in said conduits is arranged to operate said speed-control member in accordance with said difference of fluid pressures.

Other features of the invention will be described hereinafter and pointed out in the claims.

The invention is illustrated diagrammatically and by way of example in the accompanying drawing, wherein—

Figure 1 is a diagrammatic plan view, partly in horizontal section, showing one form of power-transmission mechanism comprising one form of differential mechanism, as described and claimed in my co-pending patent application Serial No. 158,257;

Figures 2 and 3 are elevations showing two other forms of differential mechanism according to the present invention, parts being broken away;

Figure 4 is a vertical longitudinal sectional elevation taken on the bent line in Figure 5 showing one constructional form of part of the device shown in Figure 3;

Figure 5 is a vertical transverse section taken on the line 5—5 in Figure 4; and Figure 6 is an elevational view, more or less diagrammatic, showing an assembly of portions of the constructions shown in Figures 1 and 2.

Referring first to Figure 1, a motor vehicle is provided, as usual, with power-transmission mechanism comprising an internal-combustion engine 10, a clutch 11 driven thereby, and a change-speed gear 12 for three speeds and reverse having its driving shaft 13 coupled with the clutch 11, and having its driven shaft 14 arranged to drive a propeller shaft 15 for driving the rear axle. A differential mechanism comprises two elements 20, 21 whereof one is in the form of a nut 20 journalled in a bearing 16 on the gear-box and held thereby against endwise movement. This nut carries or is integral with a pulley driven by the driving shaft 13 of the change-speed gear at the engine side of the gear-box. The second element of the differential mechanism is in the form of a screw-threaded portion 21 of a spindle 24 received by said nut and extending beyond both ends of the same. The end of the spindle 24 constituting the element 21 is arranged to adjust a lever 28 connected to the engine throttle valve, while the other end of said spindle 24 is journalled in a second bearing 17 on the gear-box and has between that bearing and the screw-threaded portion 21 a squared portion 29. This spindle 24 is operatively connected with the driven shaft 14 of the change-speed gear by variable transmission gear in the form of variable friction gear comprising two friction discs 30, 31, whereof the smaller 30 is slidable along but non-rotatable on the squared portion 29 of said spindle. The second, larger friction disc 31, lies adjacent to but at right-angles to the smaller disc and is slidably carried on the squared outer end of a shaft 32 that is driven through gearing by the driven shaft 14 of the change-speed gear. Any convenient mechanism may be provided for adjusting the two friction discs so that the gear ratio of the same is equal to a desired gear ratio of the change-speed gear. Conveniently the rod 26 may be connected to the spindle 24 by a ball and socket joint as indicated at 38.

Assuming that the vehicle is travelling with the change-speed gear set at a given gear ratio and that it is desired to change to a different gear ratio, the friction discs 30, 31 are set to that desired gear ratio by shifting the smaller disc 30 along the squared portion 29 of the spindle 24, the clutch 11 is disengaged and the change-speed gear set into its neutral position. This action brings the friction discs 30, 31 into engagement; the clutch 11 is then engaged, locking the engine and driving shaft 13 of the gear-box together. The differential mechanism then adjusts the throttle of the engine into such a position that the speed of the engine will correspond to that required for the desired gear ratio, when the clutch 11 can be disengaged momentarily for the purpose of setting the change-speed gear to the desired gear ratio by actuating the gear lever. As the engine is then running at the correct speed for the new gear ratio the change is effected readily and without any danger of injury to the wheels of the gear. The change of gear having been effected, the friction discs are disengaged and owing to the disc 30 being no longer driven by the disc 31 the inherent friction of the bearing 17 will cause the screw 21 to move through the nut 20 drawing back the rod 26 and allowing the throttle to return to whatever position the engine has been set to idle at. This mechanism as described so far is claimed in my aforesaid co-pending patent application.

According to the present invention other forms of differential mechanism and means for controlling the engine throttle thereby are provided, and several forms of hydraulic differential mechanism according to the present invention will now be described.

Referring to Figure 2, two rotary pumps 40, 41 of the gear wheel type are arranged to be driven respectively one by the driving shaft 13 and the other by the driven shaft 14 of the change-speed gear. One pipe 42 connects the suction side of the pump 40 with the delivery side of the pump 41 and with a cylinder 43 containing a piston 44, whilst a second pipe 45 connects the delivery side of the pump 40 with the suction side of the pump 41 and with a second cylinder 46 containing a piston 47, the two pistons being operatively connected together by a three-armed lever 48 and to the engine throttle by an adjusting rod 49 in such a manner that their differential movement is utilized for actuating the throttle. Each of these pipes 42, 45 is connected between the pumps respectively by way of a non-return valve 50 to a reservoir 51 for liquid, for replenishing the system if leakage should occur at the cylinders, and spring loaded relief valves 52 may be provided one in each end of the pipes aforesaid connected to the cylinders. The driving mechanism (not shown) connecting the pump 41 with the driven shaft 14 of the change-speed gear comprises variable transmission gear whereof the gear ratio can be adjusted to be the same as that of the desired ratio of the change-speed gear which is to be brought into operation. This variable transmission gear may be analogous to that described above with reference to Figure 1 or may be of any other convenient construction. If the pump 40 driven by the driving shaft of the change-speed gear runs faster than the other then the fluid pressure in the cylinder 46 will be greater than that in the cylinder 43, so that the throttle will be operated in one sense. On the other hand, if the pump 41 runs faster, then the throttle will be operated in the other sense.

In some cases the variable transmission gear of the operative connection of one pump with its driving shaft may be omitted, both pumps being driven directly by their respective driving shafts. This results in a compact construction, as the pumps can be mounted directly on the gear box. One such construction will now be described with reference to Figure 3.

As illustrated in Figure 3 two main pumps 60, 61, which may be rotary or reciprocating pumps, have their suction and delivery ports connected by two conduits 63, 64 in the same manner as described above with reference to the pumps 40, 41 and operate on the two sides of a piston 65 movable in a cylinder 66 having enlarged ends 67 and 68 which are connected respectively to the conduits 63, 64. The piston rod 69 and tail rod 70 carry each a spring 71, 72, respectively, which permit the piston to enter each cylinder end, but tend to force it into the middle portion where it makes a fluid-tight fit with the cylinder walls. A rod 26 for adjusting the engine throttle is pivoted to the piston rod 69. As described so far this arrangement would operate in the same way as the construction shown in Figure 2 if the pump 60 were driven directly by the engine-driven shaft 13 and the pump 61 were driven by means of variable transmission gear by the shaft 14 shown in Figure 1.

In order to obviate the use of such variable transmission gear, but yet to be able to control the engine speed in relation to the road speed of the vehicle, the pump 61 has associated with it two auxiliary pumps 73, 74 having their suction ports connected each to the conduit 63 and their delivery ports connected each to the conduit 64. These conduits 63, 64 constitute valve chambers that open at the end remote from the cylinder 66 into a liquid reservoir 75. Two piston valves 76, 77 slidable respectively in the valve chambers 63, 64 have an operating member 78 in the form of a U-bar and can be moved by the latter from the position III in which they are shown into either of the positions II or I indicated in broken lines at 79 and 80 respectively, and also into position IV indicated in like manner at 81. These positions I, II and III correspond respectively to the first (or lowest), second and third (or top) gears respectively, whilst position IV is for governing purposes as described hereinafter.

The pumps 60 and 61 will be of equal capacity at equal speeds, while the auxiliary pumps 73, 74 may each be of the same capacity as the pump 61, or of different capacities. For example, the pump 73 may be of the same capacity as the pump 61 at equal speeds, whilst the pump 74 may be of twice that capacity at the same speed. These capacities will be varied according to the different gear ratios that are required. Also, more than two such auxiliary pumps may be provided and connected in an analogous manner. If rotary pumps are employed the auxiliary pumps may be of the same diameter as the main pumps and of the same or different axial length according to requirements. On the other hand, if plunger pumps are employed they may have different lengths of stroke.

Any convenient control means may be used for setting the two piston valves 76, 77, for example lever-actuated mechanism such as is used for shifting the friction disc 30 in Figure 1. When it is required to change gear the piston valves will be moved to position I, II or III, according to the new gear required, and on releasing the clutch pedal after the change-speed gear has been put into neutral, whereby the engine will drive the pumps, the action of the pumps on the piston 65 and consequently on the throttle of the engine will cause the engine speed to be adjusted to that required for the new gear ratio, whereupon the change of gear can be readily effected without risk of injury, as described above with reference to Figure 1.

If desired the piston valves 76, 77 may be replaced by a plurality of valves between the pumps at the several positions I, II and III, which valves will be opened and closed separately or in unison as required.

It may be desired at times to throw the pumps out of action to enable the engine throttle to be actuated independently of them by hand or foot operation. For this purpose, in the construction shown in Figure 3 a three-way valve 90 is provided having ports 91, 92, 93 connected respectively by pipes 94, 95, 96 to the reservoir 75, valve chamber 64 and that end 67 of the cylinder 66 which is always open to the valve chamber 63. When the valve is in its fully opened position as illustrated, free connection is opened between the two valve chambers 63, 64 and the reservoir 75 so that the piston valves 76, 77 can be moved freely and the operation of the pumps is prevented from shifting the adjusting piston 65 and consequently adjusting the engine throttle, which can therefore be moved by hand or foot operation. The ports 91, 92 of the three-way valve are so wide that they still provide open connection between the two sides of the piston valve 77 in the lower valve chamber even when the pipe 96 is closed by the valve, for the purpose described hereinafter.

The cylinder 66 has enlarged ends in order to permit fluid to pass the piston 65 when the engine throttle is in its end positions, that is either fully opened or closed. The springs 71, 72 are for moving the piston 65 back to its operative position as soon as a reversal of pressure in the valve chambers 63, 64 occurs or when the three-way valve 90 is opened. This valve 90 is normally closed when the pumps are used as described above for gear changing purposes.

A single cylinder having a piston controlled on each face may be substituted, if desired, in the construction illustrated in Figure 2 for the pair of cylinders provided in that construction.

The pump 60 in the construction shown in

Figure 3 may be used as a governor for the engine. When such governing action is required the piston valves 76, 77 will be moved to position IV and the pipe 96 will be closed by the three-way valve 90 in such a position that the pipe 94 connects with the pipe 95 as described above. A spring or weighted lever (not shown) will be arranged so as to tend to open the engine throttle. The pump 60 will then tend to close the throttle with a governing action which can be regulated by adjustment of the spring or weight, or by moving the three-way valve, because the action of the pump 60 on the throttle will depend on the resistance offered by the three-way valve to the flow of liquid. This governing action need not be provided for, however, if desired.

Any convenient control mechanism may be provided for actuating the three-way valve 90, say by hand or foot operation. For example, it may be arranged that when the gear lever is in such a position that any gear is fully engaged the valve 90 is opened by mechanism controlled by the gear lever.

Figures 4 and 5 show one construction of a set of rotary pumps of the gear-wheel type accommodated in a single casing 100 common to them all. The shafts 101, 102 of the pump 60 are co-axial with the shafts of the pumps 61, 73, 74, of which shafts only 103 is visible. The valve chambers 63, 64 are also provided in the casing 100 which can be readily mounted directly on a gear-box. The auxiliary pumps 73, 74 are shown the same width as the associated main pump 61, but they may be of different widths as described above.

It will be appreciated that the invention facilitates changing from a higher gear to a lower, or vice versa, which has heretofore necessitated a certain amount of skill on the part of the driver and has frequently been the cause of injury of the change-speed gear due to faulty operation.

Any rotating part of the vehicle, such as the back wheel or front wheel axle can be used instead of the driven shaft of the change-speed gear for driving the one "converter" of the differential mechanism.

Various modifications may be made in the details of construction without departing from the scope of the invention. For example, instead of the pumps 61, 73, 74, a single pump having a variable delivery, such as a plunger pump of variable stroke, may be used. Also, in the construction shown in Figure 3 two separate cylinders may be used instead of a single double-acting cylinder. Further, the single cylinder need not have enlarged ends, but instead thereof a by-pass controlled by a valve may be provided between the valve chambers 63 and 64. Moreover, although the rotary pumps described above are examples of converters referred to above, other devices, such as electric motors, adapted to convert rotary energy into electric energy, may be used instead of pumps.

I claim:

1. Power-transmission mechanism comprising the combination with an engine having a speed-control member, a change-speed gear driven by the engine, and a driven shaft driven by said gear, of a differential mechanism comprising two elements each in the form of a "converter" operatively connected respectively with the engine and driven shafts of the change-speed gear and arranged to operate in opposite senses on said speed-control member, and control means adjustable at will for adjusting the differential operation of said "converters" selectively to a ratio equal to a desired gear ratio of the change-speed gear.

2. Power-transmission mechanism comprising the combination with an engine having a speed-control member, a change-speed gear driven by the engine, and a driven shaft driven by said gear, of a differential mechanism comprising two elements each in the form of a "converter" constituted each by a pump operatively connected respectively with the engine and driven shafts of the change-speed gear and arranged to operate in opposite senses on said speed-control member, and control means adjustable at will for adjusting the differential operation of said "converters" selectively to a ratio equal to a desired gear ratio of the change-speed gear.

3. Power-transmission mechanism comprising the combination with an engine having a speed-control member, a change-speed gear driven by the engine, and a driven shaft driven by said gear, of a differential mechanism comprising two pumps operatively connected respectively with the engine and driven shafts of the change-speed gear, two conduits connecting the suction ports of both pumps each to the delivery port of the other pump, control means adjustable at will for adjusting the differential operation of said pumps, selectively to a ratio equal to a desired gear ratio of the change-speed gear, and adjusting means actuated by the difference of the fluid pressures in said conduits and arranged to operate said speed-control member in accordance therewith.

4. Power-transmission mechanism comprising the combination with an engine having a speed-control member, a change-speed gear driven by the engine, and a driven shaft driven by said gear, of a differential mechanism comprising two main pumps operatively connected respectively with the engine and driven shafts of the change-speed gear, two conduits connecting the suction ports of both pumps each to the delivery port of the other pump, control means adjustable at will for adjusting the differential operation of said pumps selectively to a ratio equal to a desired gear ratio of the change-speed gear, and adjusting means actuated by the difference of the fluid pressures in said conduits and arranged to operate said speed-control member in accordance therewith, which control means comprise at least one auxiliary pump associated with one of said main pumps and having its suction and delivery ports connected to the second main pump in the same manner as its associated main pump is connected thereto, and a valve for controlling the pumping operation of the auxiliary pump.

5. Power-transmission mechanism comprising the combination with an engine having a speed-control member, a change-speed gear driven by the engine, and a driven shaft driven by said gear, of a differential mechanism comprising two main pumps operatively connected respectively with the engine and driven shafts of the change-speed gear, two conduits connecting the suction ports of both pumps each to the delivery port of the other pump, control means adjustable at will for adjusting the differential operation of said pumps selectively to a ratio equal to a desired gear ratio of the change-speed gear, and adjusting means actuated by the difference of the fluid pressures in said conduits and arranged to operate said speed-control member in accordance therewith, which control means comprise a plurality of auxiliary pumps associated each with one of said main pumps and having each its suction and delivery ports connected to the second main pump in the same manner as their associated main pump is connected thereto, a casing common to said auxiliary pumps and the associated main pump which are arranged co-axially therein, and have a shaft common to them all, and a valve for controlling the pumping operation of said auxiliary pumps.

6. Power-transmission mechanism comprising the combination with an engine having a speed-control member, a change-speed gear driven by the engine, and a driven shaft driven by said gear, of a differential mechanism comprising two main pumps operatively connected respectively with the engine and driven shafts of the change-speed gear, two conduits connecting the suction ports of both pumps each to the delivery port of the other pump, control means adjustable at will for adjusting the differential operation of said pumps selectively to a ratio equal to a desired gear ratio of the change-speed gear, and adjusting means actuated by the difference of the fluid pressures in said conduits and arranged to operate said speed-control member in accordance therewith, which control means comprise at least one auxiliary pump associated with one of said main pumps and having its suction and delivery ports connected to the second main pump in the same manner as its associated main pump is connected thereto, and a valve for controlling the pumping operation of the auxiliary pump and the main pump associated therewith.

7. Power-transmission mechanism comprising the combination with an engine having a speed-control member, a change-speed gear driven by the engine, and a driven shaft driven by said gear, of a differential mechanism comprising two main pumps operatively connected respectively with the engine and driven shafts of the change-speed gear, two conduits connecting the suction ports of both pumps each to the delivery port of the other pump, control means adjustable at will for adjusting the differential operation of said pumps selectively to a ratio equal to a desired gear ratio of the change-speed gear, and adjusting means actuated by the difference of the fluid pressures in said conduits and arranged to operate said speed-control member in accordance therewith, which control means comprise a plurality of auxiliary pumps associated each with one of said main pumps and having each its suction and delivery ports connected to the second main pump in the same manner as their associated main pump is connected thereto, a casing common to said auxiliary pumps and said main pumps which are arranged co-axially therein, which auxiliary pumps and the main pump associated therewith have a shaft common to them all, and a valve for controlling the pumping operation of said auxiliary pumps.

8. In mechanism for controlling the speed of an engine by adjusting a control member, differential mechanism comprising in combination two "converters" arranged to be driven by a driving and driven shaft respectively, means for controlling the operation of said "converters", and means actuated by the difference of operation of said "converters" for adjusting the control member of the engine.

9. In mechanism for controlling the speed of an engine by adjusting a control member, differential mechanism comprising in combination a casing, two pumps situated in said casing and arranged to be driven respectively by a driving and driven shaft, a valve for controlling the operation of said pumps, and a piston actuated by the difference of operation of said pumps arranged to adjust the control member of the engine.

10. In mechanism for controlling the speed of an engine having a control member, differential mechanism comprising in combination a casing having a working chamber and two valve chambers, which valve chambers are connected together at one end by a reservoir and at the other end by a cylinder, two main rotary pumps and at least one auxiliary pump co-axial therewith situated in said working chamber and having their suction and delivery ports so connected to said valve chambers that one of said main pumps is connected oppositely to the other main pump and its associated auxiliary pump, two valves, one in each valve chamber, for controlling the connection of said pumps one to another, a piston movable in said cylinder and arranged to adjust said control member under the action of the difference of operation of said pumps, and a three-way valve having three ports, whereof one is connected to said reservoir, and the second and third are connected respectively to the said valve chambers at the ends thereof connected to said cylinder.

In testimony whereof I affix my signature.

HENRY MORAN.